Jan. 26, 1954     W. T. MILLER     2,667,474
HEAT TREATMENT OF POLYTRIFLUOROCHLOROETHYLENE PLASTIC
Filed Feb. 21, 1947
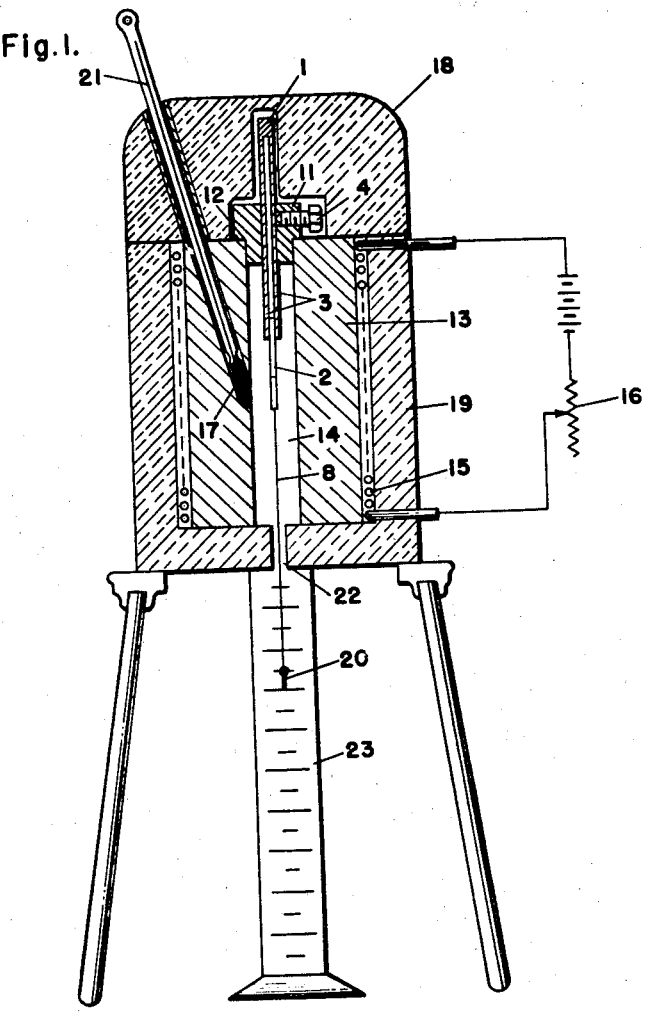
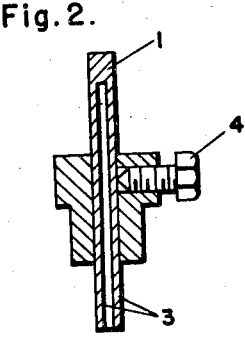
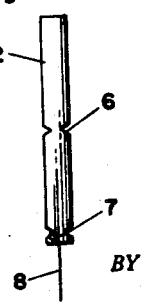
INVENTOR.
WILLIAM T. MILLER
BY Patented Jan. 26, 1954

2,667,474

UNITED STATES PATENT OFFICE 2,667,474

HEAT TREATMENT OF POLYTRIFLUORO-CHLOROETHYLENE PLASTIC

William T. Miller, Ithaca, N. Y., assignor to the United States of America as represented by the United States Atomic Energy Commission Application February 21, 1947, Serial No. 730,176

2 Claims. (Cl. 260—92.1)

The present invention relates to polytrifluorochloroethylene plastic.

This application is in part a continuation of my application, Serial Number 601,387, filed June 25, 1945.

An object of the invention is to provide a plastic material combining the properties of chemical stability and mechanical characteristics which render it workable and useful in many practical applications.

Another object of the invention is to provide methods for processing the polytrifluorochloroethylene plastic to obtain a variety of physical properties.

A further object is to provide plasticized compositions of the polytrifluorochloroethylene plastic.

The above and other objects will become apparent in the course of the following description and will be pointed out more particularly in the claims.

For a long time there has been a search for a material which can be used to construct useful articles and which at the same time possesses chemical and thermal stability of a high order. The need for construction materials resistant to the action of highly corrosive materials, to the deteriorating effects of oxygen and light, and to the dissolving action of various materials has been great. In chemical processing the action of acids, alkalis, oxidizing agents, reducing agents, corrosive halides, have imposed serious and expensive limitations upon processing equipment. While it has been possible in most cases to employ resistant metals, alloys, ceramics, carbon or other materials resistant to the particular agents involved for the construction of the principal processing equipment, it has been difficult to find materials possessed of the properties of resiliency desirable for equipment gaskets, valve seats and the like and further to find materials possessing the property of transparency for use as sight glasses, observation windows, instrument covers, etc. Aside from these applications in the presence of strong chemical agents, there are other equally critical needs for resilient and in some cases for transparent materials which have great resistance to the solvent action of various substances. Recently there has been produced a plastic possessing many of these desired properties. This material is known as polytetrafluoroethylene. While the substance is very stable chemically and is very useful for many of the industrial purposes indicated, it has been found difficult to fabricate, is undesirably soft for some purposes, lacks sufficient mechanical strength for many uses, is waxy in texture and is generally opaque except in very thin sections.

In accordance with the present invention a plastic is provided which by comparison with polytetrafluoroethylene is easy to fabricate, is hard, has high mechanical strength and is transparent in relatively thick sections. The plastic of the present invention can be plasticized readily with perfluorochlorocarbons of lower molecular weight to produce plasticized compositions with a variety of physical properties which retain the desirable characteristic of high stability. Other plasticizers can be used, particularly other halogenated hydrocarbons where the stability characteristics of the mixture are satisfactory for a desired purpose. For example, trichloroethylene can be used to plasticize the plastic. The plastic of this invention can furthermore be uniformly dispersed in liquid perfluorochlorocarbons at high temperatures.

The product provided by the invention is a high molecular weight polytrifluorochloroethylene. The product is made by polymerizing trifluorochloroethylene. This polymerization can be performed in a variety of ways. Conditions favorable to the polymerization include the use of polymerization promoters, and the use of moderate to high pressures. A number of variations in the polymerization process are indicated in the examples set out below. A preferred method for performing the polymerization involves the use of bistrichloroacetyl peroxide as a promoter and the use of moderate pressures and low temperatures during the polymerization. An example of this preferred process is found below designated as Example 8. Other polymerization procedures found effective include the use of other peroxides, oxygen or boron trifluoride etherate as the promoter and are described in the examples. Polymer within the desired range of molecular weight has also been produced by the action of ultraviolet light.

The conditions used in the polymerization can be selected to control the average chain length of the polymer and the distribution of polymer molecules of various chain lengths in the product so as to vary the properties of the product as to softening point, strength, and fabricating characteristics.

Polymerization reactions are ordinarily carried out with liquid monomer with or without the addition of a low molecular weight chlorofluoro compound such as $CF_2ClCFCl_2$ or $CFCl_3$ to serve as a diluent or as a solvent for the addition of promoter. In general the use of relatively low peroxide concentrations and low temperatures favors the formation of higher molecular weight polymer. High pressures while not essential for the production of high molecular weight material favor increased conversion and the formation of higher molecular weight polymer. On the other hand, increasing the temperature of reaction and/or the promoter concentration reduces the molecular weight of the polymer formed. Conveniently an indication of the molecular weight is obtained by measurement of the "no strength temperature" designated N. S. T., that is, the temperature at which all strength properties of the polymer are lost. A method of measuring the N. S. T. is fully described hereinafter.

An important factor favoring the bulk polymerization procedures is the insolubility of trifluorochloroethylene high polymer in the monomer. The concentration of monomer in the liquid phase remains nearly constant and the promoter concentration much more so than would be the case if a homogeneous polymer-monomer solution were formed. This facilitates reproducibility of reaction conditions and of polymer products. The insolubility of polymer in monomer results in the formation of a porous final polymer structure and greatly facilitates the removal and recovery of excess unreacted monomer.

The molecular weight distribution of the polymer produced is controlled by varying the polymerization conditions such as the initial promoter concentration and the temperature of reaction. The reaction conditions may also be altered during the course of a polymerization in order to achieve variations in molecular weight distribution of the polymer produced. For example, promoter may be added intermittently or continuously to an agitated reactor and the temperature of reaction may be varied during the course of a run. With static reactors of large cross section, temperature gradients are established within the reactor as polymerization proceeds due to the poor heat conduction of the polymer mass and for such systems the geometry is an important factor in determining reaction conditions throughout the mass.

Polymerizations may be carried out in a continuous manner by pumping the monomer and promoter through a tube maintained at the desired reaction temperature by an outside bath.

To vary the molecular weight distribution of a product, blending of different molecular weight plastic subsequent to polymerization may also be utilized. Hot milling is the preferred procedure for this purpose.

The following examples illustrate a number of methods by which the polymer can be prepared.

*Example 1*

20 gms. of trifluorochloroethylene mixed with 20 gms. of $CF_2ClCFCl_2$ (1,1,2-trifluorotrichloroethane) as solvent and 1 gm. of benzoyl peroxide were sealed in a heavy walled glass tube and heated at 95° C. for 36 hours to yield 5.6 gms. of white solid polymer which melted over the range 170–190° C.

*Example 2*

About 5 ccs. of $CF_2=CFCl$ and 5 ccs. of $CF_2ClCFCl_2$ as solvent with approximately 1 g. of anhydrous aluminum chloride, $AlCl_3$, were sealed in a glass tube. The sealed tube was heated in an oven at about 30° C. After three hours the liquid phase became cloudy with suspended solid. The tube was removed from the oven, cooled, opened and the $CF_2=CFCl$ evaporated. The residue after evaporation of the $CF_2=CFCl$ was washed thoroughly with dilute aqueous HCl. Distillation of the washed residue yielded a yellow solid as a residue. This solid first melted and then sublimed when held on a spatula tip in a flame.

*Example 3*

50 gms. $CF_2=CFCl$ and 2.5 gms. benzoyl peroxide were sealed in a heavy walled glass tube and heated at 85° C. for 60 hours to yield 19 gms. of a solid polymer.

*Example 4*

26 gms. $CF_2=CFCl$ dissolved in 25 gms. $CHCl_3$ together with 1.2 gms. benzoyl peroxide were sealed in a heavy walled glass tube and heated at 85° C. for 100 hours to yield 25.2 gms. white solid after the solvent was largely removed. Approximately 30% of this solid product was soluble in acetone. Evaporation of the acetone left a Vaseline-like material. The acetone-insoluble solid melted above 150° C. The acetone-soluble material was partially distillable at 0.5 mm. of pressure and yields an oil as a distillate.

*Example 5*

50 gms. trifluorochloroethylene and approximately 0.25 gms. of bis-trichloroacetyl peroxide $(CCl_3CO_2)_2$ were thoroughly mixed and maintained in a sealed glass tube at 0° C. for 72 hours. 26 gms. of white, spongy solid were obtained after removal of unreacted olefin. This polymeric material softened at about 200° C. and could be hot pressed, extruded, milled, rolled and formed into fibers.

*Example 6*

In a manner similar to that described in Example 5, 1260 gms. of trifluorochloroethylene and 15.9 gms. of bis-trichloroacetyl peroxide were maintained in a sealed glass tube at −17 to −19° C. for 128 hours, yielding 595 grams of high polymer solid. The product obtained by this low temperature polymerization was tougher than that obtained at 0° C.

*Example 7*

A mixture of 797 grams trifluorochloroethylene ($CF_2=CFCl$) and about 0.6 of a gram of bis-trichloroacetyl peroxide was transferred to a thin walled lead container at −78° C. The container was filled to overflowing, warmed to the boiling point of the mixture (about −26° C.) to remove dissolved gases, then cooled to −78° C. while maintaining nitrogen gas above the liquid surface, and finally the container neck was clamped shut and sealed by fusing. The sealed container was placed in a tight chamber and subjected to fluid pressure at 13,900 to 16,000 pounds per square inch at −17° to −14.5° C. for about 100 hours. Thereafter the container was opened and the solid product, comprising 385 grams of white polytrifluorochloroethylene having a N. S. T. of 305° C., recovered. This represents a yield of 48%.

*Example 8*

17 lbs. 2 oz. of trifluorochloroethylene purified by distillation from $P_2O_5$ was charged into a 6" diameter stainless steel bomb at −78° C., together with 25 cc. of a 2.03% solution of trichloroacetyl peroxide in trichlorofluoromethane.

The bomb was evacuated to about the vapor pressure of the contents and sealed after which the contents were mixed by shaking and the temperature of the bomb raised to about −16° C. The bomb was then maintained at this temperature for about 10 days.

The non-volatile product of the above reaction comprised 6 pounds of polytrifluorochloroethylene having a N. S. T. of 315° C.

Example 9

86.1 gms. of trifluorochloroethylene which had been distilled from NaOH and refluxed with $P_2O_5$, was mixed in an evacuated glass bomb with a 1:1 solution of trichlorofluoromethane and acetyl peroxide $((CH_3CO_2)_2)$ at −78° C. to produce a concentration of peroxide in the mixture of 0.045%. The filled bomb (a thick walled Pyrex glass tube 200 mms. long, 32 mms. outside diameter) was evacuated to about the vapor pressure of the contents and then sealed. The sealed bomb was maintained at room temperature for 29 days.

The non-volatile product of the above reaction comprised 24.6 gms. of polytrifluorochloroethylene having a N. S. T. of 286° C.

Example 10

89.3 gms. of trifluorochloroethylene which had been previously purified by distillation from $P_2O_5$ and then through silica gel was pumped into a 300 cc. heavy wall Pyrex glass bomb at −78° C. The bomb was cooled to −190° C. and was connected to a vacuum pump to empty it of gas. In order to introduce oxygen to serve as a promoter for the polymerization, the open bomb was then stored in the dark under pure gaseous oxygen for about 3 days at −78° C. The bomb was then sealed and placed in a shaker in a dark place, after which the temperature was raised to 70° C. and then maintained between 54° and 70° C. for 19 hours.

The non-volatile product of the above reaction comprised 24.6 gms. of polytrifluorochloroethylene having a Fisher-Johns melting point range of 208°–212° C.

Example 11

A thick walled Pyrex glass bomb was filled at −78° C. with 100 gms. of relatively pure $$CF_2=CFCl$$

and 2.5 gms. of boron trifluoride methyl etherate $((CH_3)_2O,BF_3)$. The bomb was pumped to remove any entrapped air and then sealed. The bomb was shaken to mix the contents and was then maintained at −16° C. for 24 hours in the dark. It was then raised to room temperature and maintained at that temperature for about 30 days.

The non-volatile product of the above reaction comprised 12.3 gms. of polytrifluorochloroethylene having a N. S. T. of 308° C.

Example 12

About 10 ccs. of liquid trifluorochloroethylene was charged below its boiling point into a high pressure reaction vessel and held under a pressure of 16,000 kilograms per square centimeter for 21 hours at room temperature. Essentially all of the trifluorochloroethylene was converted to a solid polymer. No promoter was added in this run but the possibility of atmospheric oxygen acting as a promoter is not precluded. The equipment used in attaining the high pressure described was designed by P. W. Bridgman and is described in his book "The Physics of High Pressures" published 1931.

The product obtained by the polymerization methods described operating at low to moderate pressures is a white spongy material lacking in mechanical properties for most uses. At high pressures a more compact material is normally obtained but in all cases the physical form of the polymer and its mechanical properties may be improved by working it, preferably by hot pressing. Other methods of working such as plasticizing with lower molecular weight perhalocarbons followed by extrusion or the like can also be used.

In lieu of the promoters used in the examples, ultraviolet light may be used to promote the polymerization.

The polymers produced by the methods of the examples and by other polymerization techniques have a variety of useful properties. The physical properties cover a range of strengths, hardnesses, softening points, etc. Some of these properties can be correlated with the method of preparation and others with an arbitrary test described below.

The polymer is not adaptable to conventional molecular weight measurements at ordinary temperatures because of its insolubility. A simple test was devised instead which gives relative measures of molecular weight based on a careful measurement of the temperature at which all strength properties are lost. This temperature is referred to in the following examples as the "no strength temperature" and is abbreviated N. S. T. The N. S. T. also serves as a useful guide in pressing and molding work. In measuring N. S. T. a specific apparatus is used as illustrated in the drawings wherein:

Figure 1 is an elevation of an N. S. T. measuring apparatus with the heating unit in vertical section.

Figure 2 is a detail view of the test sample and sample clamp, the clamp being partly shown in axial section.

Figure 3 is a detail view of the test sample.

As shown in Figures 1 and 2 the sample 2 is clamped between the jaws 3 of the clamp 1 by tightening the set screw 4. The clamp 1 is an extension of the plug 11 which is inserted into the bore 14 of the tube 13. The plug 11 serves to center the sample 2 in the bore 14 of the tube 13 and the flange 12 limits the extent to which the plug may be inserted in the bore. The tube 13 is heated by electrical heating element 15. The temperature of the heating element is controlled by a resistance 16. The temperature of the block is measured by a thermometer 21 in thermometer well 17. The apparatus is thermally insulated by the insulating members 18 and 19 and member 18 can be removed to give access to the plug 11. A weight 20 is attached to sample 2 by a free hanging wire 8 which passes through the insulation 19 at hole 22. A scale 23 serves to indicate the movement of the weight 20. The test is performed by clamping a sample of specified dimensions of polymer into the clamp as shown in Figure 2, placing it in the heater in the position shown in Figure 1, and heating it slowly until it breaks. The dimensions of each sample must be reproduced to careful specifications. The sample 2 is notched at the center 6 to insure its breaking at this point.

A sample of polytrifluorochloroethylene, produced by the method of Example 7 and hot pressed into a  thick sheet, was cut into a strip ⅛″ by  by 2″ and notched as indicated in Figs. 2 and 3 to a thickness of 3/64 by 1/16" at notch 6. A fine wire 8 and weight 20 were attached to the lower end at the notch 7 so that the total weight from the notch 6 down was 0.5 gram. The temperature of the sample was increased at the rate of about 1.5° C. per minute as the breaking temperature was approached by slowly increasing the potential across the heating element 15. The sample broke at 305° C. and the N. S. T. for the sample is therefore 305° C. Differences of 5° C. up to about 325° C. are considered significant. All N. S. T. values hereinafter referred to were determined on a sample of the same dimensions in a similar apparatus. N. S. T. values are found to be independent of the sample heat treatment, so long as extreme temperatures which produce thermal cracking are avoided.

The plastic of this invention is especially advantageous in that it combines ease of fabrication with unusually high use temperatures in addition to its properties of high stability. In molding and extrusion operations the plastic is processed in general as a high softening temperature thermoplastic material and can in general be satisfactorily handled with equipment of conventional design constructed to operate at temperatures of the order of 300° C. Chromium, stainless steel and aluminum are satisfactory air oxidation resistant materials for contact with the plastic at processing temperatures.

The following is a typical procedure for the preparation of sheets from the plastic of the invention. A polymer having a N. S. T. of about 305° C. and prepared by the method of Example 7 was placed in the form of small chips between thin polished chrome platens in a hydraulic press held at 300–310° C. The polymer was piled in the center of the platens and thin metal stops were placed at their edges to control the final thickness of the pressed sheet. The sample was preheated for five minutes with slight pressure applied to facilitate heat transfer. The pressure was gradually increased after five minutes so that the polymer was compressed and began to flow out at such a rate that after ten minutes, the platens were in contact with the metal stops. The platens and pressed sheet were then removed from the press and cooled. For the production of 1/8" sheet, final pressures of the order of 400 pounds per square inch are convenient. Higher pressures are necessary for the production of very thin sheet, as for example, 5/1000" which is conveniently pressed between aluminum foil.

At molding temperatures the plastic is sufficiently fluid for good adherence to roughened metal surfaces in producing protective coatings and may for example be used to coat and completely fill the interstices of 100 mesh stainless steel wire cloth by hot pressing the wire cloth between thin plastic sheets. Similar technique may be used to insulate wires or conducting metal strips for electrical purposes as well as more conventional extrusion procedures.

Small molded articles such as rings, plugs, flanged test tubes, threaded tube couplings, blanks for machining valve parts, may be readily fabricated, for example by transfer molding technique. Tubing and rods may be extruded and wire insulated for electrical purposes. Fibers and filaments may be produced.

The rate at which the polymer is cooled affects its physical properties. One of the properties affected is hardness. To illustrate, samples of polymer with a N. S. T. of 307° C. were subjected to various cooling procedures and hardness of the samples determined. The hardness is expressed in Vickers hardness numbers abbreviated V. H. N. Measurements were made with an Eberbach Microhardness Tester, manufactured by Eberbach and Sons Co., Ann Arbor, Michigan. All samples were pressed according to the typical procedure outlined above, removed from the press at about 310° C. and then cooled by the method indicated in Table 1 below, except for the last sample which was left in the press under pressure and allowed to cool with the press.

TABLE 1

| Cooling Procedure | V. H. N. |
| --- | --- |
| Sample quenched in water at 16° C | 6.7 |
| Sample transferred to a thermostated press at 50° C | 7.8 |
| Sample transferred to a thermostated press at 125° C | 8.8 |
| Sample transferred to a thermostated press at 150° C | 9.1 |
| Sample slowly cooled in insulated box | 10.1 |
| Sample slowly cooled in hot press | 11.4 |

The softening obtained in the quenched sample may be applied practically in the production of valve seats and gaskets. When articles of substantial thickness are prepared they may be quenched to soften their surfaces but because of poor heat transfer the interior is less effectively cooled and remains relatively hard. This treatment gives the desirable combination of a relatively soft surface and a hard body which resists deformation. The quenched material is more pliable than the slow cooled material, the quenched higher N. S. T. material being more pliable in general than quenched low N. S. T. material.

The physical properties of the polymer of the invention may be changed by heat treatment subsequent to the initial pressing and cooling. For example a quenched sample of high molecular weight polymer prepared by the method of Example 7 is hardened by heating it to about 215° C. and cooling it slowly. Conversely slow cooled material of the same type is softened by heating it to about 215° C. and quenching it. Evidently these higher polymers have a transition temperature above which samples lose the physical properties acquired by previous cooling or heat treatment history, as will be more fully described below. Quenched material is highly transparent in thin sheets (less than 1/8 inch) whereas slow cooled material is opalescent.

Heat treating may be performed below the transition temperature by prolonged heating, the rate of subsequent cooling not being significant. A quenched sample of polymer similar to that prepared in Example 7 was heated to 195° C. for three days. The V. H. N. increased from 6.7 to 10.1. A similar sample heated at 132° C. for ten days had a V. H. N. of 8.9. The trend is for lower N. S. T. material to undergo more rapid hardening on heat treatment. Quenched polymer sheets which have been heat treated to produce properties such as hardness similar to those of the slow cooled material are rendered less transparent by the process but remain considerably more transparent than slow cooled material of corresponding thickness. It will be seen that by varying the thermal treatment of the solid plastic very useful changes in physical properties may be made inexpensively and without affecting the chemical stability of the plastic.

The trifluorochloroethylene high N. S. T. polymer undergoes changes in physical properties as a result of thermal treatments which are characteristic of the composition. When relatively thin quenched samples of the composition are heated to approximately 200° C. they become opalescent. The opalescence increases with temperature and reaches a maximum at about 210° C. followed by a sharp clearing at 212–214° C. Conversely when the cleared samples are cooled from above 214° C. at about 1° per minute an opalescence develops at 188–182° C. Table 2 lists the clearing and clouding temperatures for samples over a range of N. S. T. values.

TABLE 2

| N. S. T. of Sample, ° C. | Clearing Temp., ° C. | Clouding Temp., ° C. |
|---|---|---|
| 316 | 212–213 | 187–182 |
| 285 | 212–213 | 186–184 |
| 262 | 212–213 | 187–186 |
| 247 | 213–214 | 185–184 |
| 233 | 212–213 | 186–185 |

The transition of physical properties and the clearing of opalescence both occur at the same temperature. As this phenomenon is independent of the N. S. T. of the sample used or the method of preparation of the polymer over a wide range of conditions it is considered to be a characteristic of the trifluorochloroethylene polymers having N. S. T.'s of at least 225° C. Also, as N. S. T. values are indications of relative molecular weight, this property appears to be independent of molecular weight over a wide range.

The index of refraction of transparent quenched high N. S. T. polymer was found to be 1.430±.001. No significant variation was shown within the accuracy of measurement over a wide N. S. T. range, but slow cooled and heat treated material had a higher index.

The density of the high polymer was found to vary from 2.11 for quenched polymer to about 2.13 for slow cooled samples. Heat treated material had a maximum observed density slightly greater than for slow cooled material.

The solid polymer has a specific resistance of $5 \times 10^{17}$ ohms at room temperature and gives an indication of being a good insulator by its tendency to hold a static charge.

Under tensile stress the quenched solid polymers undergo deformation and orientation. After orientation in testing (⅛ x ⅛ x 1" test sections) typical quenched polymer samples of N. S. T. in the range 290 to 325° were found to have tensile strengths lying principally in the range of 8 to $10 \times 10^3$ pounds per square inch at break. By stretching at 130° before testing at room temperature ultimate breaking strengths greater than $24 \times 10^3$ p. s. i. may be observed. Polymer slow cooled from above the transition temperature of approximately 214° C. or quenched material which is heat treated below the transition temperature in the approximate range of 175 to 200° C. requires a greater stress than the quenched material to produce distortion but undergoes less elongation before breaking.

In order to determine the extent to which the N. S. T. affects plastic flow, samples of polymer of uniform size but having a range of N. S. T. values were subjected to a known pressure at 225° C. The determination was made at 225° C. at which temperature the effect of past thermal history on properties is removed. Table 3 lists the final thickness of sample disks of ⅜" diameter and ⅛" thickness which had been exposed to a 50 pound force for 20 minutes at 225° and the corresponding N. S. T. for the sample. The greater ease of flowing out of the lower N. S. T. material is apparent.

TABLE 3

| N. S. T. | Final Thickness in mils |
|---|---|
| 335° | 29.2 |
| 299° | 23.5 |
| 280° | 20.9 |
| 262° | 18.4 |
| 247° | 14.6 |
| 229° | 11.4 |

Whereas over a considerable range of N. S. T. thermal treatment is the most important variable in determining the physical properties of the composition at ordinary temperatures, thermal treatment has no appreciable effect on chemical properties. The composition is non-flammable and is not attacked by strong mineral acids or oxidizing agents such as chromic-sulfuric acid, hydrochloric acid, chlorine gas nor by strong alkalis such as NaOH. It resists attack by fluorine gas but may react with fluorine on heating or when in contact with other reactive materials such as hydrocarbon oils in the presence of fluorine. Samples of the polymer which had been very carefully purified and cleaned were used with good results as gasket materials in the presence of fluorine at 150° C. At temperatures above about 300° C. the polymer begins to be unstable and ultimately undergoes thermal decomposition. Solid high polymer having a N. S. T. of about 250° C. is substantially insoluble in various solvents such as hexafluoroxylenes

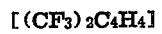

$$[(CF_3)_2C_4H_4]$$

di-n-butylphthalate, 1,2,3,4-tetrachloroperfluorobutane, tetrachloroethylene, ethylene glycol, diethyl ether, "Dowtherm" (a mixture of 75% diphenyl ether and 25% diphenyl), benzyl alcohol, perfluorodimethylcyclohexanes, pyridine, liquid chloropropane, hexachlorobutadiene, chloroform, acetone, trichloroethylene, nitrobenzene, xylene, 1,2,3 - trichloroperfluoropropane, bromobenzene quinoline, 2-nitropropane, nitromethane, carbon tetrachloride, 1,2 - dichloroperfluorocyclobutane, dioxane, 1,1,2-trifluorotrichloroethane, ethyl benzene, and methylene chloride as tested at 50° C. for 2 to 3 days. It absorbs certain relatively low molecular weight solvents such as chloro and chlorofluoro compounds, benzene and acetone to varying extents with swelling. For example at 45° C. appreciable quantities of benzene, methylene chloride, chloroform, carbon tetrachloride, dichloroethylene, trichloroethylene, tetrachloroethylene, 1,1,2-trifluorotrichloroethane, 1,2- and 1,1-difluorotetrachloroethane were absorbed in 40 hours. On the other hand negligible quantities of n-heptane, n-hexane, methyl cyclohexane, alcohol, perfluoroheptane, perfluorodimethyl cyclohexane were absorbed under the same conditions. With a given solvent, slow cooled or heat treated material swells less than material quenched from above the transition temperature.

Modified properties of the solid polymer are obtained by plasticization. Lower members of the saturated perfluorochlorocarbon series with physical properties ranging from oils to waxes are particularly valuable for this purpose. They are highly compatible with the high polymer and avoid reduction of the desired properties of chemical inertness. The preferred procedure for the preparation of the plasticized material is by hot milling the plasticizer and polymer together. The plasticized material is softer, more flexible, and more rubbery than the pure solid polymer.

*Example 13*

Plasticized polytrifluorochloroethylene compositions suitable for molding and extrusion were prepared as follows:

Six pounds 8 ounces of polytrifluorochloroethylene with a N. S. T. of 324° C. were placed in a large wide mouth bottle and 10.4 ounces (10% of weight of solid polymer) of a low vapor pressure liquid polytrifluorochloroethylene polymer with a molecular weight of about 750 were added. The bottle and contents were placed in a 60° C. oven for 48 hours. The plastic mixture was then removed from the bottle and milled on a roll mill heated initially to 180 to 190° C.

Another composition was prepared by mixing ground solid polymer (N. S. T. 324° C.) with a polytrifluorochloroethylene oil at room temperature in a dough mixer and then working the mixture on a roll mill at 180 to 230° C. for 5 minutes. The milled mixture was removed from the mill and pressed rapidly to ⅛ inch sheets at 300° C., total press time being 2 minutes. Plasticizer (oil) loss tests on sample sheets in a 60° C. air oven showed weight losses after 76 days of 0.02% at 10% plasticizer, 1.78% at 30% plasticizer, and 12.79% at 60% plasticizer, as against 0.03% for a check sample of unplasticized solid polymer which value was within the experimental error of measurement.

The plastic polytrifluorochloroethylene of the invention can be used for a wide variety of purposes. For example, laboratory test tubes, beakers, bottles and the like can be made by pressure die molding methods, tubing of various sizes can be made by extrusion methods, other equipment and parts can be made by machining, etc. Such chemical ware is valuable for working with highly corrosive materials at moderate temperatures. Other articles made from the plastic include gaskets, valve seats, insulators, transparent sheets, and machine parts. The plastic can be drawn out into threads which can be stretched to orientate the polymer chains to give increased tensile strength. Additions such as metal powders, pigments, coloring agents etc. can be worked into the plastic to impart special properties.

The most valuable polytrifluorochloroethylene plastics of the invention, from the standpoint of mechanical properties, are those with no strength temperatures of at least 225° C. and particularly those with no strength temperatures above about 250° C. The choice of preferred no strength temperature is dependent upon the final application desired and thermal treatment to be used in fabrication. The easier flow properties during fabrication of the lower range N. S. T. material which are, for example, especially advantageous when it is desired to cause the material to flow into small openings must be balanced against the superior mechanical properties of the higher N. S. T. material. The softest, most transparent, fully quenched material and the strongest fibers have been produced from material with an N. S. T. above 300° C. The term "plastic" is reserved in the present application to those polymers which demonstrate properties of substantial mechanical strength and to distinguish from lower solid perfluorochloroethylene polymers which are preferably designated as waxes.

Since many embodiments might be made of the present invention and since many changes might be made in the embodiment described, it is to be understood that the foregoing description is to be interpreted as illustrative only and not in a limiting sense.

I claim:

1. The method of treating a tough, thermoplastic orientable polytrifluorochloroethylene which comprises heating the polymer to above its transition temperature, rapidly quenching the hot polymer, and thereafter heating the quenched polymer for a relatively long time at a temperature below its transition temperature.

2. The method of treating a tough, thermoplastic orientable polytrifluorochloroethylene having a no strength temperature of at least 215° C. which comprises heating the polymer to above its transition temperature, rapidly quenching the hot polymer, and thereafter heating the quenched polymer for a relatively long time at a temperature of at least 150° C. but below its transition temperature.

WILLIAM T. MILLER.

References Cited in the file of this patent

UNITED STATES PATENTS

| Number | Name | Date |
|---|---|---|
| 2,392,378 | Hanford | Jan. 8, 1946 |
| 2,510,078 | Compton | June 6, 1950 |
| 2,531,134 | Kropa | Nov. 21, 1950 |
| 2,600,802 | Passino | June 17, 1952 |

FOREIGN PATENTS

| Number | Country | Date |
|---|---|---|
| 465,520 | Great Britain | May 3, 1937 |
| 578,168 | Great Britain | June 18, 1946 |
| 796,026 | France | Mar. 27, 1936 |